2,926,137
FILTER AID FROM FLY ASH
Robert Calvert, Scarsdale, N.Y.

No Drawing. Application November 30, 1956
Serial No. 625,259

9 Claims. (Cl. 210—500)

This invention relates to filter aid from fly ash.

This application is a continuation-in-part of application Serial No. 451,309, filed by me on August 20, 1954, and entitled "Filter Aid," now abandoned, which in turn is a continuation-in-part of application Serial No. 407,588, now abandoned, filed by me on February 1, 1954 and entitled "Recalcined Fly Ash."

Fly ash is that part of the ash of coal burning power plants that does not settle readily. It passes up and out of the stack unless special means are employed to retain the fly ash and thus avoid pollution of the atmosphere. These special recovery means ordinarily include electrostatic precipitation and sometimes also mechanical separators in advance of the electrical precipitator.

My new product is useful as a filter aid, as in filtering raw sugar solutions, the fermented liquor (beer) in the manufacture of antibiotics, water, sewage, used cleaners' naphtha, and the like. As a filter aid it should prove sufficiently economical for use in the enormous tonnages indicated for water and sewage filtrations, fields which diatomaceous earth, because of its cost, has not been able to enter in extensive manner.

Filter aids are powders that, when mixed with a turbid liquid to be filtered, collect on the filter cloth and retain fine suspended matter from the liquid.

In the calcination of diatomaceous earth, as with a flux such as salt or soda ash at around 1900° F., to make the present leading filter aid, care is taken to avoid such overheating as would destroy the diatom structure or give fused beads. Any bead material that does form during the calcination is air separated later in so far as feasible and discarded.

Fly ash as made is calcined necessarily by passage through the flame of the burner, at temperature estimated to be approximately 2800° F. This temperature is so high that the photomicrograph of Pearson and Galloway (Civil Eng., September 1953, 38–41) shows the particles fused mostly into little rounded beads or spheres. Yet this calcined fly ash filtered the test liquor (60% raw sugar solution) only about 5% as fast as the flux calcined diatomaceous earth, even when the latter is used in somewhat smaller proportion to the raw sugar (see Table 1). Also filtration with the fly ash did not give clarity of filtrate at an early period in the filtration cycle and not at all with some proportions of the fly ash. Finally, the filtrate obtained with the fly ash as received showed precipitation on the addition to it of a solution of sodium carbonate, a difficulty later understood when analysis showed 1.75% of water soluble material in the fly ash.

I have now made fly ash into a filter aid that (a) is low in water solubles, (b) filters the test liquor faster than the highest grade natural diatomaceous earth used in the same proportion, (c) and, when used in twice the proportion by weight (slightly less than equal proportion by volume), shows a filtration rate as high as 80%–128% (see Table 8) of that obtained with the commercial flux calcined diatomaceous earth and with substantially as good clarity in representative runs.

Briefly stated, the invention comprises the herein described process of and product resulting from calcining fly ash initially of high residual fuel content, to a temperature at least as high as red heat and light caking together of the particles but below the temperature of forming a hard mass, and reducing the resulting material to the form of powder. In further improving the rate of filtration or clarity of filtrate obtained with the fly ash, the invention comprises one or more of the following features and for best results all of them: effecting the calcination with restriction of access of oxygen (air); mixing the fly ash with a minor proportion of added flux for siliceous materials in advance of the calcination step; effecting the calcination of the fly ash in a layer (en masse), so that the particles when hot are in direct contact with each other and, at the temperature of calcination, adhere lightly together, and then disintegrating the resulting weak lumps or masses; and applying the processing described to fly ash showing originally an ignition loss of about 15%–37%.

REPRESENTATIVE PROCESSING, METHOD OF TESTING, AND RESULTS

In the tests reported here and elsewhere herein, except as noted to the contrary, all proportions are expressed as parts by weight, the percentage of filter aid is based upon the weight of the raw sugar used in test filtrations without the added water, the filtrations are made without a precoat, the diatomaceous earth used for the comparison is a premier grade of the commercial flux calcined product, and the filtrations are made at about 85° C. and a maximum pressure of 40 lbs./sq. in., the pressure being raised to that level at the rate of 5 lbs. a min. beginning with the start of the filtration cycle.

The data on clarity, in the last columns of Tables 1–6 and 8, show the time, after the beginning of filtration with the commercial flux calcined diatomaceous earth, when the clarity of its filtrate first approximately matches that of the fly ash filtrates at 10 minutes after the start of the filtration cycle. The longer the filtration cycle with the flux calcined diatomaceous earth, taken as the standard for comparison, must proceed before the clarity of filtrate obtained equals that of the filtrate obtained with the fly ash at the test period of 10 minutes, the more effective is the fly ash shown to be in thoroughness of clarification of the liquor being filtered.

The flux calcined diatomaceous earth was used in the proportion of 0.5% of the weight of the raw sugar.

Calcinations of fly ash samples for test, except as noted, were made with restriction of access of air, so as to restrict oxidation within the charge and leave a substantial proportion of residual fuel, in caked condition, in the product. The period of heating at the maximum temperature was approximately 1 hour. Temperatures of calcination are stated in degrees F.

Representative products and filtration properties thereof are shown in Table 1. Results with fly ash as received, natural diatomaceous earth filter aid, and the same after flux calcination and commercial processing are included for comparison. The fly ash used in these tests contained at the start residual fuel in amount to make the ignition loss about 18% or more exactly 18.5%.

In this Table 1 and elsewhere herein, the mark ' is for the abbreviation for time in minutes after the start of the filtration cycle, F.A. for fly ash, and D.E. one of the several abbreviations for diatomaceous earth of filtration grade.

All fly ash samples reported in Table 1 that had been calcined with restriction of access of air (in covered

Table 1

| Material Tested as Filter Aid | Filter Aid, Percent of Raw Sugar | Rate of Filtration, Percent of Rate Obtained with 0.5% of Flux Calc. Dia. Earth | Clarity of Filtrate at 10′=Filtrate Obtained with Com'l Flux Calc. D.E. at— |
| --- | --- | --- | --- |
| Comparison samples: | | | |
| Flux calc. D.E. | 0.5 | [1] 100 | 10′. |
| Natural D.E. | 0.5 | 22 | 30′+. |
| Fly ash as received | 0.75 | 5 | Bad. |
| Do | 1.0 | 6 | 3′. |
| Do | 1.5 | 9 | 3′. |
| Fly ash calcined: | | | |
| 1,820° with air | 0.5 | 30 | 2′. |
| 1,850° with air | 1.5 | 52 | |
| 1,850° air restricted | 1.5 | 52 | Ca. 10′. |
| Fly ash calcined with flux: | | | |
| 4% salt, 1,850° with air | 1.5 | 61 | 6′. |
| 4% salt, 1,850° air restricted | 1.0 | 52 | 10′. |
| 4% salt, 1,940° air restricted | 1.0 | 80 | 10′. |
| Do | 2.0 | 103 | 30′. |
| 3% soda ash, 1,770° air restricted | 1.5 | 90 | 5′. |

[1] Standard.

crucibles) gave filtrates that, at the end of a 30′ filtration cycle with the 60% raw sugar solution, were as clear as the filtrates with the flux calcined diatomaceous earth after 27 to 30 minutes or more of the filtration cycle.

Milling the fly ash before calcination, as with knives (thin bars rotating edgewise) to give light milling, improved the clarity of the filtrates obtained. Thus fly ash knife milled, mixed with 4% salt, calcined with restriction of access of air at 1940° for 1 hr., and tested as a filter aid in the proportion of 1.5% of the raw sugar, gave a filtrate of clarity at 10′ better than with 0.5% flux calcined diatomaceous earth at 30′. Milling if any after calcination must be extremely light, otherwise filtration falls badly.

MATERIALS AND CONDITIONS

The fly ash used in obtaining the data of Table 1 was the electrically precipitated fraction of a large producer, whose average fly ash shows about the following analysis: Silica 40%, alumina 25%, ferric and ferrous oxides 14%, calcium and magnesium oxides 4.5%, potassium and sodium oxides 1.5%, titanium dioxide 1.4%, germanium trace, and residual fuel and miscellaneous ingredients to make 100% total. For four different and representative electrical power plants producing fly ash, the residual fuel content of this ash for a recent 12-months period, as measured by ignition loss, averaged 4.9%, 10.8%, 3.2% and 8.2%, respectively. The fly ash as received was dark gray in color, dusty, and not quite impalpable. When I discovered that a fly ash of ignition loss 15% or higher was required to make a good filter aid by my process, I was able to obtain the fly ash of 15%–32% ignition loss described herein.

A number of physical tests on fly ash used by me are recorded below, the specific surface area test being by the A.S.T.M. method.

| Test | Fly Ash | | |
| --- | --- | --- | --- |
| | Sample as rec'd | Lightly Milled | Hammer Milled 2× |
| Specific surface area, cm.²/g | 3,800 | 6,252 | 6,764 |
| Specific gravity | 2.3 | 2.13 | 2.31 |
| Screen test: | | | |
| on 60 mesh percent | 1 | | |
| thru 60, on 100 do | 2 | | |
| thru 100, on 200 do | 8 | | |
| thru 200, on 325 do | 8 | | |
| on 325 do | 18 | 8 | |
| thru 325 do | 81 | 82 | 92 |

The specific surface area may be said to run from about 3000 to 7000 sq. cm./g.

This sample as received lost 18.5% on ignition, showing approximately the same carbon content (to within about 1 unit).

I have found that the residual fuel content (loss on ignition) of the fly ash has an important effect on the filtration properties of the product. A fly ash of low residual fuel content, on calcination, at temperatures satisfactory from the standpoint of insolubilizing water solubles, and subsequent cooling gives a relatively hard mass. The product, after redispersion by very light milling, is a gritty material of low clarifying power for liquids containing fine slime. High residual fuel content, on the other hand, favors desirable softness and low density of product and good clarifying power. I obtain satisfactory filter aid when the proportion of residual fuel is within the approximate range 15%–32% by weight of the fly ash as received, the said fuel content being taken as the "ignition loss" on heating a sample of the fly ash to redness in an open crucible until the fuel is burned away.

The flux used, if any, is a flux for siliceous materials. Examples are sodium chloride, sodium carbonate, sodium silicate, the corresponding potassium salts, and mixtures of one or more of these or like salts. I use approximately 2%–7% of the flux on the weight of the fly ash.

The liberation of acidic gases from sodium chloride during the calcination may be decreased by mixture of the salt with an alkali, as, for example, by 1–3 parts of soda ash to 2–3 parts of salt. The soda, alone or mixed, also promotes insolubilizing of ferrous iron.

I may also calcine the fly ash after mixing it with diatomaceous earth in powder form. In such a mixture the fly ash in small proportion serves as a flux or bonding agent and makes unnecessary, for some purposes at least, the addition of any further quantity of chemical flux for the diatomaceous earth. The fly ash in larger proportion serves to extend the earth, so as to decrease the amount of it required in the filter aid. The proportion of the diatomaceous earth may be varied from 10–75 parts for 100 parts of the mixture, with the production of a satisfactory filter aid after the calcination.

The temperature of calcination must be at least a red heat required to cause heat softening of the surfaces as shown by light adherence of contacting particles of the fly ash, to give a soft caked or somewhat lumpy mass. The temperature must be below that at which the resulting material, after cooling, is hard and difficult to disintegrate or to mill without forming a gritty product. Satisfactory temperatures are within the range 1600°–2200° F., the exact temperature within the range being selected in accordance with the residual fuel content of the fly ash used, the speed of filtration and filtrate clarity desired in use of the finished product, and also the required extent of insolubilizing originally water soluble material of the fly ash. Ordinarily the higher temperatures favor high rate of filtration. Also they increase the insolubilization. At the sacrifice of one or more of these properties, lower temperatures may be used, as down to 1500°. The higher the residual fuel content of the fly ash used, the higher may be the temperature within the range stated.

The effect of temperature of calcination with restriction of access of air on filtration properties of the calcined fly ash are shown in Table 2.

The time of calcination at the selected maximum temperature need not be extended much beyond that required to make certain of the establishment satisfactorily of the desired temperature throughout all parts of the fly ash being calcined. Using crucibles holding about 50 g. of charge, I have kept the temperature of the muffle furnace, in which they are being calcined, at the selected maximum temperature for 0.1–4 hours, ordinarily about 1 hour. In any case the temperature of calcination is maintained until the pyrolytic decomposition (coking) of residual

*Table 2.—Effect of temperature of calcination of fly ash (18% I.L.)*

| Flux and Temperature Used in Calcination | Filter Aid, Percent of Raw Sugar | Filt. Rate, Percent of Rate Obtained with 0.5% Flux Calc. D.E. | Clarity of Filtrate at 10'=Clarity Obtained with Flux Calc. D.E. at— |
|---|---|---|---|
| 4% salt, 1,600° | 1.0 | 56 | 4'. |
| 4% salt, 1,700° | 1.0 | 75 | 10'. |
| 4% salt, 1,940° | 1.0 | 80 | 10'. |
| 3% salt, 1% soda ash, 1,940° | 1.0 | 80 | 15'. |
| 3% soda ash, 1,550° | 1.5 | 41 | 9'. |
| Same, 1,700° | 1.5 | 90 | 5'. |
| Same, 1,820° | 1.5 | 85 | 4'. |
| 5% soda ash, 1,700° | 1.5 | 91 | 4'. | fuel present in the original fly ash is substantially completed and the conversion of water solubles to insolubles practically ceases or is completed to the extent necessary in the end use of the product. This heating results also in volatilization of heat volatilizable material, including, it is considered, a substantial part of the germanium content (if any in the particular fly ash used) in the form of its volatile but condensable chloride. When air is excluded from the calcination, the remaining carbon is distributed throughout the mass in finely divided form so that the mass is usually darker in color than the original fly ash.

The fly ash, either alone or with the added flux, was calcined in all preparations in a layer so that the particles rest upon each other. Adherence and formation of a new structure results as the contacting particles soften during the calcination. The subsequent redispersion by very light milling, as by brushing through a screen or by blades of a fan, leaves a structure suitable for filtration.

The restriction of the access of air, is sufficient to leave in the charge at least 30% of the orginal carbon or fuel content. For best results as to clarity of filtrates obtained with the filter air, about 5%–30% of carbon, as measured by loss of ignition, should be left in the calcined product.

Restriction of access of air to the extent necessary may be effected by calcination in covered crucibles in the laboratory or, in factory runs, by use of either a deficiency of air over the fuel used for heating or only a slight excess while the charge being calcined is maintained in a thick layer. A rotary kiln, with no provision for sifting the falling material through an air space may be used.

The invention will be further illustrated by detailed description in connection with the following more specific examples of the practice of it.

EXAMPLE 1.—FLUX CALCINATION WITH EXCLUSION OF AIR

The electrically precipitated fly ash as received and of ignition loss 18.5% was mixed thoroughly with 4% of its weight of ground salt, placed in a covered porcelain crucible, heated over several hours up to 1940° F., and then held for an hour at the maximum temperature of approximately 1940° F. registered on a thermocouple in the air space above the crucibles in an electric muffle furnace. The thus calcined material was then removed from the furnace, the cover being kept on the crucible during the subsequent cooling. The cooled product was a black, soft, somewhat crispy cake easily crushed to powder between the fingers.

The product was brushed with a small paint brush through a 60 mesh brass wire screen, lumps being broken as necessary by pressure of the brush handle against the side of the screen. All but 2% of grit went through the screen. This grit was discarded.

The apparent density of the powder was determined by filling 40 g. of it into a graduated cylinder. The loose volume was about 135 ml. Tapped to aproximately constant volume, it was 62 ml., corresponding to 0.65 g./ml. It is 2.3 times the density for commercial flux calcined diatomaceous earth determined in like manner.

The powder was tested in various proportions for filter aid properties in 60% raw sugar solution. The results were compared with those obtained with the commercial flux calcined diatomaceous earth used on the same sugar in the proportion of 0.5% of the weight of the sugar. The results follow:

*Table 3.—Filtration with fly ash calcined with 4% salt at 1940° F. with restriction of access of air*

| Minutes after Start of Filtration Cycle | Calc. Fly Ash, Percent of Raw Sugar | | |
|---|---|---|---|
| | 0.5% | 1.0% | 2.0% |
| | Clarity of Filtrate equals Filtrate with Flux Calc. D.E. at— | | |
| 3' | 2' | 3'–4' | 7' |
| 5' | 2' | 5' | 12' |
| 10' | 3' | 10' | 30' |
| 20' | 4' | 17' | 30' |
| 30' | 4' | 27' | 30' |
| Filtration rate v. flux calc. D.E. percent | 52 | 80 | 103 |

The recommended proportion of the fly ash filter aid is 1%.

When these filtration results are compared with those of examples in which air was given free access to the fly ash during the calcination, it will be observed that the carbon retained here has improved the clarifying power of the filter aid.

The loss in weight of a representative mixture of fly ash (of ignition loss 18.5%) with 4% salt calcined in this manner was 6.7%. This loss would include volatiles of the residual fuel, a part of the salt, ferric chloride, germanium chloride, and the like and also some loss of carbon by unintentional oxidation.

Except as noted to the contrary, the general procedure of this example is followed in the other examples, as with the compositions, conditions, and results noted in Table 1 or elsewhere herein.

EXAMPLE 2.—FLUX CALCINATION WITH AIR ADMISSION

The fly ash was mixed with 4% of salt and calcined for 1 hour at 1850° F. maximum, with free admission of air to the crucible. After the calcined material was cooled, there was noted an overly firm top crust about 0.5 cm. thick. This was lifted off and discarded. It is considered to have been caused by overheating due to carbon monoxide from the residual fuel of the fly ash, partly oxidized below, burning over the top of the charge. Below this crust, the material was brick red until near the bottom of the crucible. This bottom part of the charge was not completely oxidized but was gray to black because of the proportion of retained carbon. After cooling, the material was brushed through a 100 mesh brass screen. The product was chocolate to coffee colored.

As compared with filtrations of raw sugar with 0.5% of commercial flux calcined diatomaceous earth, this calcined fly ash, used in the proportion of 1% and with a precoat, gave a rate 83% of that obtained with 0.5% of the said earth.

In the test with 1% of the calcined fly ash, a precoat of 0.3 g. was applied in advance to the filter cloth (2.35 cm. dia.) in addition to the 1% (7 grams for 700 grams of raw sugar) in the body of the liquor.

Clarities were not as good as in Example 1 and also were not as good as with the flux calcined diatomaceous earth. The readings follow.

*Table 4.—Filtration with fly ash, 4% salt, 1850°, air admitted, 1% on wt. of raw sugar*

| Time after start of the filtration | Clarity at 10'= 0.5% Flux Calc. D.E. at— |
|---|---|
| 3' | 2'-3' |
| 5' | 3' |
| 10' | 4' |
| 20' | 4' |
| 30' | 20' |

EXAMPLE 3.—VARIOUS FLUXES AND CONDITIONS

Fly ash milled twice with hammers in a Micropulverizer was mixed with various fluxes and in various proportions and then calcined at 1850° F. for 1 hour, with free access of air to the crucibles in which the mixes were separately contained. The cooled products in each case were brushed through 100 mesh screen. The results follow.

*Table 5.—Fly ash, hammer milled 2×, then 5% flux, 1850°*

| Flux Used | Filtration Properties v. 0.5% Flux Calc. D.E. | | |
|---|---|---|---|
| | Percent of Aid Used | Rate of Filt. v. the D.E. | Clarity at 30' Equals— |
| Salt | 1.0 | 105 | D.E. at 9'. |
| Soda Ash | 1.45 | 93 | D.E. at 22'. |
| Sodium silicate | 1.0 | 144 | D.E. at 2'. |
| Mixed salt 4% and soda ash 1% total. | 2.0 | ¹ 117 | |

¹ With precoat.

EXAMPLE 4.—VARYING PROPORTIONS OF CONTAINED FUEL

Mixed bituminous and semibituminous coal, pulverized for delivery to the air blast burners of a large power plant and containing about 24% of volatiles was mixed with fly ash specimens containing residual fuel corresponding to ignition losses of 8.4% and 18.5% respectively, ignition loss being the loss in weight on calcining a sample of the fly ash in an open crucible until oxidizable material present is oxidized. The mixes and also the original samples of fly ash were then calcined with 4% of added salt at approximately 1950° for 1 hour, with exclusion of air. The added coal resulted in softer products of the calcination, decreased rates of filtration, and unimproved and in some cases lessened clarities of filtrate as compared with results obtained with the same fly ash samples without admixed coal. Filtration results for the several products follow.

*Table 6*

| Ignition Loss of the Fly Ash Used, Percent | Coal Added, Percent of F.A. | Filtration Rate with 1% of the Salt Calcined Fly Ash as Percent of Rate with 0.5% Flux Calcined Diat. Earth |
|---|---|---|
| 8.4 | 0 | 50 |
| 8.4 | 10 | 25 |
| 18.5 | 0 | ¹ 78 |
| 18.5 | 10 | 76 |
| 18.5 | 20 | 41 |

¹ These conditions in other calcinations gave product of filtration rate 83% or higher.

In strong contrast are the results with fly ash samples in which the variation in fuel content is inherent in the samples of fly ash as produced. Filtration results for various samples mixed as received with 4% of salt (NaCl) and then calcined at about 1940° F. with restriction of access of air, and brushed, after cooling, through a 60 mesh screen follow. In this table the ignition loss is expressed as the nearest whole percent.

*Table 7*

| Ignition Loss of Fly Ash Used, Percent | Calc. Temp., °F. | Resulting Mass | Rate of Filt., Percent with 1% v. 0.5% Flux Calc. D.E. |
|---|---|---|---|
| 4 | 1,950 | Hard | No test possible. |
| 6 | 1,950 | do | Do. |
| 7 | 1,950 | do | Do. |
| 7 | 1,700 | Medium | 33. |
| 10 | 1,900 | Hard | No test possible. |
| 15 | 1,900 | Firm | 72. |
| 18 | 1,940 | Soft | 83. |
| 32 | 1,940 | Very soft | 91. |
| 60 (sp. fraction) | 2,000 | No sinter | 8. |

The 60% material was not fly ash proper but a separated fraction thereof. I have not found any sample of commercial fly ash of ignition loss too high for use in my process of making an effective filter aid.

Clarity of filtrate improves with the ignition loss of the fly ash used, up to 32% I.L., the highest for any unclassified fly ash available to me.

The fly ash of ignition loss 32%, after being calcined at 1940° with 4% salt, remained a powder with only a few very soft lumps. The recommended temperature for such raw material of high residual fuel content is 2100°–2200°.

EXAMPLE 5.—SELECTED CONDITION OF CALCINATION AND WATER SOLUBLE CONTENT OF PRODUCT

On the basis of conclusions from my earlier work, I have made a series of heatings of fly ash under selected conditions and determined the filtration properties of the product.

Included in the series was an attempt to determine whether better distribution of the flux would improve the result; my sprinkling in of the flux and subsequent hand mixing of the flux and fly ash does not give such uniform dispersion of the flux as would be expected from mechanical distribution on a commercial scale.

For this purpose I used a sample of fly ash that had been calcined with 4% salt at 1940° F. and cooled to a temperature below that of rapid oxidation of the carbon content on exposure to air (in this case to ambient temperature). This I brushed through a 60 mesh screen to form a powder, and then remixed it alone, these steps producing light milling and subsequent additional mixing. A sample was then calcined a second time in a covered crucible.

Other preparations made in this series are shown for comparison in Table 8, all fly ash filtration tests being made with 1% and compared with filtration with 0.5% of commercial flux calcined diatomaceous earth on the weight of the raw sugar.

*Table 8.—Selected conditions of calcination*

| Composition and Processing | Filtration Results | |
|---|---|---|
| | Rate percent of 0.5% D.E. | Clarity at 10'=D.E. at— |
| Fly ash, 4% salt 1,940° | 83 | 17' |
| Same, second calcination with intermediate milling and mixing | 128 | 10' |
| Fly ash, 3% salt, 1% soda, 1,850°–1,940° | 80 | 15' |

Water soluble contents found were 0.25% for the flux calcined diatomaceous earth, 0.10% for the fly ash sample made with 3% salt and 1% soda.

At 30' the filtrates with each of the fly ash products were judged to be better in clarity than the filtrate with the diatomaceous earth at 30', except that the recalcined material of rate 128% was only equal in clarity at 30'.

EXAMPLE 6.—QUENCHING HOT CALCINED FLY ASH IN WATER

Dropping hot fly ash direct from the calcining equipment and while still at a red heat into water caused disintegration of the lightly sintered mass to a powder. This powder, when filtered, dried, and brushed through a 100 mesh screen gave somewhat better results in filtering raw sugar than obtained with fly ash similarly processed but without the water cooling.

EXAMPLE 7.—SEMIPERMANENT FILTER AID

Semipermanent or reusable filter aid, suitable for those in distant locations or industries in which the cost of filter aid must be kept to a minimum, is a feature of the product. The filter aid is subject to regeneration in simple manner, so that only makeup quantities are required to maintain a supply of effective material for such users if provided with regenerating equipment.

The regeneration process includes water washing and settling of the filter aid away from the suspended dirt.

When a simple washing and settling process is applied to flux calcined diatomaceous earth, on the other hand, the separation of slime removed from the liquor with which the diatomaceous earth has been previously used is incomplete. Furthermore, the washed diatomaceous earth settles slowly in water and to a coherent, rather difficultly resuspendable mass.

Although the washed calcined fly ash settles rapidly, the settled layer is readily resuspended in water by agitation or pumping. The quick settling and other properties of the calcined fly ash promote such clean separation of the fly ash from the filter slime that the regenerated material has been found, in representative runs, to filter the test liquor as fast or faster than the fresh calcined fly ash.

To illustrate the recovery, filter cakes from 12 filtration runs with the fly ash of 18% I.L. calcined with 4% of salt at 1940° F. were collected over a period of about two weeks, each cake as made being dropped into and then retained under water. The total water used was about 20 parts by weight for 1 of the filter cake on the dry basis. In recovering the filter aid, the combined filter cakes and water were agitated briskly for 75 minutes. Then the fly ash was settled for 10', the total depth of the layer of suspension from which the settling was made being 10 cm. The overlying liquor was black. It was poured from the settled fly ash.

The settled material was then resuspended in about 8 times its weight of water and resettled for 5' from the suspension in a thickness of layer of 4 cm.

The resettled material was then filtered on a vacuum filter, washed with a small amount of water, and then dried by warming.

The dried material fell to a light powder on brushing. It was coffee colored, as compared to black for the original filter aid.

The lightening of the color shows that much of the carbon of the calcined filter aid had been removed; some component of the slime from the raw sugar filter is considered to assist in the separation of carbon from the fly ash.

The dried and recovered fly ash filtered raw sugar, under the standard conditions using 1% by weight of the filter aid, 185% as fast as 0.5% of flux calcined diatomaceous earth in a ten minute cycle, as compared with a rate of 83% for the same fly ash (made by calcination with 4% salt at 1940° F.) when used for the first time. The clarity of filtrate was somewhat less satisfactory with the recovered filter aid than with the original sample in its first use.

It will be understood that it is intended to cover all changes and modifications of the examples of the invention herein chosen for the purpose of illustration which do not constitute departures from the spirit and scope of the invention.

What I claim is:

1. In making a filter aid, the process which comprises mixing pulverized coal fly ash of residual fuel content corresponding to loss on ignition of about 15%–32% with an added alkali metal compound serving as a flux for siliceous material, in the proportion of 2%–7% of the flux on the weight of the fly ash, subjecting the resulting mixture to heating at a temperature of caking together of some at least of the particles of fly ash without forming a hard mass and within the range 1600°–2200° F., cooling the heated product, and subjecting it to any disintegration required to reduce the product to a powder of size of particles to pass in predominating proportion through a 60-mesh screen.

2. In making a filter aid, the process which comprises mixing pulverized coal fly ash of residual fuel content corresponding to loss on ignition of about 15%–32% with an added alkali metal compound serving as a flux for siliceous material, in the proportion of 2%–7% of the flux on the weight of the fly ash, subjecting the resulting mixture to heating at a temperature of caking together of some at least of the particles of fly ash without forming a hard mass and within the range 1600°–2200° F. and with access of air restricted to an amout leaving unoxidized in the heated material at least 30% of the carbon content of the original fly ash, and cooling and distintegrating the resulting product to a powder of size of particles to pass in predominating proportion through a 60-mesh screen.

3. In making a filter aid, the process which comprises mixing pulverized coal fly ash of residual fuel content corresponding to loss on ignition of about 15%–32% with an added alkali metal compound serving as a flux for siliceous material, in the proportion of 2%–7% of the flux on the weight of the fly ash, subjecting the resulting mixture to heating at a temperature of approximately 1600°–2200° F., cooling the heated product, disintegrating the product to a powder, recalcining the resulting powder at approximately 1600°–2200° F., cooling the recalcined powder, and disintegrating the resulting recalcined product to a powder of size of particles to pass in predominating proportion through a 60-mesh screen.

4. The process of making a filter aid which comprises heating pulverized coal fly ash in powder form containing about 15%–32% of residual fuel at a temperature approximately within the range 1600°–2200° F., cooling the product so formed and disintegrating it, without grinding, to a powder, and recalcining the said powder to a temperature of about 1600°–2200° F., cooling the thus recalcined material, and disintegrating the resulting product, without grinding, to a powder of fineness to pass through a 60-mesh screen.

5. The process of claim 3 which comprises restricting access of oxygen to the fly ash during the calcination to an amount less than that required for oxidation of the carbon of the residual fuel present, so as to leave finely divided carbon in the product.

6. The process of claim 4 which comprises restricting access of oxygen to the fly ash during the calcination to an amount less than that required for oxidation of the carbon of the residual fuel present, so as to leave finely divided carbon in the product.

7. The process of claim 1 in which the flux used is salt.

8. The process of claim 1 in which the flux used is sodium carbonate.

9. The process of claim 1 in which the flux used is a mixture of sodium chloride and sodium carbonate in the proportion of 2–3 parts of the chloride for 1–3 of the carbonate.

(References on following page)

References Cited in the file of this patent

UNITED STATES PATENTS

| | | |
|---|---|---|
| Re. 19,166 | Thatcher | May 15, 1934 |
| 110,042 | Hull | Dec. 13, 1870 |
| 1,198,039 | Krause | Sept. 12, 1916 |
| 1,247,503 | Caven | Nov. 20, 1917 |
| 1,701,272 | Naugle | Feb. 5, 1929 |
| 1,904,699 | Singmaster | Apr. 18, 1933 |
| 2,140,850 | Palmieri | Dec. 20, 1938 |

FOREIGN PATENTS

| | | |
|---|---|---|
| 516,645 | Great Britain | Jan. 8, 1940 |